United States Patent
Stiehler et al.

(10) Patent No.: US 11,519,296 B1
(45) Date of Patent: Dec. 6, 2022

(54) BEARING CHAMBER HOUSING FOR A TURBOMACHINE

(71) Applicant: MTU Aero Engines AG, Munich (DE)

(72) Inventors: Frank Stiehler, Bad Liebenwerda (DE); Georg Kempinger, Eching (DE); Juergen Kraus, Dachau (DE); Steffen Schlothauer, Erdweg (DE); Christian Liebl, Bockhorn (DE); Alois Eichinger, Pfaffenhofen (DE); Thomas Koebke, Eichenau (DE)

(73) Assignee: MTU Aero Engines AG, Munich (DE)

( * ) Notice: Subject to any disclaimer, the term of this patent is extended or adjusted under 35 U.S.C. 154(b) by 792 days.

(21) Appl. No.: 16/273,280

(22) Filed: Feb. 12, 2019

(30) Foreign Application Priority Data

Feb. 19, 2018 (DE) .............................. 102018202494

(51) Int. Cl.
*F01D 25/18* (2006.01)
*F01D 25/16* (2006.01)

(52) U.S. Cl.
CPC ............. *F01D 25/18* (2013.01); *F01D 25/16* (2013.01)

(58) Field of Classification Search
CPC ........ F01D 25/16; F01D 25/18; F01D 25/183; F01D 25/24; F01D 25/186; F01D 25/12; F01D 25/125; F01D 25/32; F01M 11/02; F01M 11/00; F01M 11/0004; F01M 11/065; F01M 11/06; F01M 9/06; F16N 31/00; F16C 33/6677; F16C 33/6659; F16C 3/02; F16C 3/04; F05D 2260/98

USPC ................................ 415/126, 229; 184/6.11
See application file for complete search history.

(56) References Cited

U.S. PATENT DOCUMENTS

| | | | |
|---|---|---|---|
| 9,500,230 B2 | 11/2016 | Hiller et al. | |
| 2014/0190347 A1 | 7/2014 | Wong et al. | |
| 2016/0265386 A1* | 9/2016 | Annati | .................... F04D 25/04 |
| 2016/0326959 A1 | 11/2016 | Burnside et al. | |
| 2017/0182561 A1* | 6/2017 | Scancarello | ........ F04C 18/0215 |
| 2019/0249572 A1* | 8/2019 | Humhauser | ............. F01D 25/28 |

(Continued)

FOREIGN PATENT DOCUMENTS

| | | |
|---|---|---|
| CA | 2488436 C | 1/2013 |
| DE | 102014208040 | 10/2015 |
| DE | 102016222030 | 12/2017 |

(Continued)

*Primary Examiner* — Devon C Kramer
*Assistant Examiner* — Kelsey L Stanek
(74) *Attorney, Agent, or Firm* — Davidson, Davidson & Kappel, LLC

(57) ABSTRACT

A bearing chamber housing for supporting a shaft of a turbomachine is provided, the bearing chamber housing including an additively built-up housing wall which bounds an oil chamber of the bearing chamber housing radially outwardly relative to an axis of rotation of the shaft, the housing wall being built up with an oil duct which has an inlet opening toward the oil chamber for admission of oil from the oil chamber into the oil duct, and which has an outlet opening for discharging the oil from the oil duct, the outlet opening being located at a different axial position and at a different circumferential position than the inlet opening, considered relative to the axis of rotation of the shaft, and the oil duct having an extent with both an axial component and a circumferential component, at least over a portion thereof.

18 Claims, 3 Drawing Sheets

(56) References Cited

U.S. PATENT DOCUMENTS

2021/0301875 A1* 9/2021 Lefebvre ............... F16C 35/077

FOREIGN PATENT DOCUMENTS

| | | | |
|---|---|---|---|
| DE | 102016222411 | 5/2018 | |
| DE | 102016222412 | 5/2018 | |
| EP | 1722074 A2 | 11/2006 | |
| EP | 2163733 A2 | 3/2010 | |
| EP | 2657553 A1 | 10/2013 | |
| EP | 2770613 A2 | 8/2014 | |
| EP | 3032046 A1 | 6/2016 | |
| EP | 3244026 A1 | 11/2017 | |
| GB | 2522315 A * | 7/2015 | ............ F01D 25/16 |
| WO | WO2014093286 A1 | 6/2014 | |
| WO | WO2016021489 A1 | 2/2016 | |

* cited by examiner

BEARING CHAMBER HOUSING FOR A TURBOMACHINE

TECHNICAL FIELD

This claims the benefit of German Patent Application DE 102018202494.4, filed Feb. 19, 2018 and hereby incorporated by reference herein.

The present invention relates to a bearing chamber housing for supporting a shaft of a turbomachine.

BACKGROUND

The turbomachine may be, for example, a jet engine, such as a turbofan engine. The turbomachine is functionally divided into a compressor, a combustor and a turbine. In the case of the jet engine, for example, drawn-in air is compressed by the compressor and mixed with jet fuel and burned in the downstream combustor. The resulting hot gas, a mixture of combustion gas and air, flows through the downstream turbine and is expanded therein. The turbine is typically made up of a plurality of stages, each including a stator (stator vane ring) and a rotor (rotor blade ring), the rotors being driven by the hot gas. In each stage, a portion of the internal energy is removed from the hot gas and converted into motion of the respective rotor blade ring and thereby of the shaft.

SUMMARY OF THE INVENTION

The present subject matter relates to a bearing chamber housing for supporting the shaft. The reference made herein to a jet engine is initially not intended to limit the inventive idea in its generality. The turbomachine may, for example, also be a stationary gas turbine.

It is an object of the present invention to provide a particularly advantageous bearing chamber housing for a turbomachine as well as an advantageous method for the manufacture thereof.

The present invention provides a bearing chamber housing and a method for the manufacture thereof. A housing wall of the bearing chamber housing is additively built up; i.e., produced by solidifying a previously amorphous or shape-neutral material in selected areas based on a data model (see below for more details). In accordance with the present invention, the housing wall is built up with an oil duct as an integral part thereof. This oil duct has an inlet opening for admission of oil from an oil chamber outwardly bounded by the housing wall, and an outlet opening (to which may be connected, for example, a pump for aspiration of the oil). The inlet and outlet openings differ both in their axial positions and in their circumferential positions; i.e., they are axially and circumferentially offset from each other. In accordance with the present invention, the oil duct is positioned on or in the housing wall in such a way that it extends with both an axial and a circumferential component at least over a portion thereof.

The oil duct can be configured to extend in this—figuratively speaking—screw-like or helical fashion because the housing wall is additively built up; additive manufacturing makes complex geometries possible. For comparison, if an oil duct were formed in a housing wall produced by a casting process, this oil duct would have to be divided into separate sections to compensate for axial and circumferential offsets, one such section extending only circumferentially and the other, subsequent section extending only axially, because demolding would otherwise not be possible. Apart from the fact that this alone would require a complex mold, the screw or helical shape made possible here by additive manufacturing reduces the extent of the duct between the inlet and outlet openings. The shorter duct may help reduce flow losses, especially because, from a fluid flow perspective, the screw or helical shape may already be better than a duct that is divided into a plurality of sections that each have their own extent. An improved aspiration through the oil duct then makes it possible, for example, to size an associated pump smaller, which may provide advantages in terms of weight, space requirements and cost.

Preferred embodiments will be apparent from the dependent claims and the entire disclosure. In the description of the features, a distinction is not always drawn specifically between apparatus, device and use aspects. In any case, the disclosure should be read to imply all claim categories. When reference is made to a bearing chamber housing manufactured in a particular way, then this should always also be read as disclosing a corresponding manufacturing method and vice versa.

In the context of the present disclosure, the terms "axial" and "radial" and the respective directions are relative to the axis of rotation of the shaft which, when considering the turbomachine as a whole, coincides with the longitudinal axis thereof. During operation, the rotors rotate circumferentially about the axis of rotation, namely in the circumferential direction. "A" and "an" are to be read as indefinite articles and thus always also as "at least one," unless expressly stated otherwise.

As far as the "extent" of the oil duct is generally described, this refers to the path of the centerline thereof. The centerline extends centrally within the oil duct along the length thereof. That is, when viewed in sectional planes perpendicular to the flow, the centerline is located in the respective centroids of the inner cross sections; i.e., flow cross sections. This centerline has in each point an axial component and a circumferential component at least over a portion of the oil duct. That is, a tangent to the centerline at a respective point extends partially axially and partially circumferentially (and possibly radially, see below).

The oil duct should have a corresponding extent "at least over a portion thereof", for example over at least, with increasing preference in the order given, 50%, 70% or 90% of its length taken along the centerline between the inlet and outlet openings. Where possible, the oil duct preferably has a corresponding path over its entire extent (100%). When viewed with respect to the installed bearing chamber housing or turbine center frame; i.e., when considering the turbomachine as a whole in the installed position, the inlet opening is preferably located at the bottom of the oil chamber (relative to the vertical direction). When viewed with respect to the gas or hot gas flow in the hot gas duct of the turbomachine, the outlet opening of the oil duct is preferably disposed downstream of the inlet opening, and thus, is then located behind and somewhat above the inlet opening. Therefore, at the axial position of the outlet opening, space is advantageously available in the bearing chamber housing at the bottom thereof, where, for example, another connection port may be disposed. Thus, the circumferential offset between the inlet and outlet openings of the oil duct may be advantageous with respect to the accessibility of the oil chamber bounded by the housing wall for connections thereto.

Due, inter alia, to the relatively small wall thicknesses that can be achieved by generative manufacturing, the oil duct will generally not (completely) be disposed within the housing wall, but protrude from a wall surface of the housing wall. While, generally, an oil duct that bulges radially outwardly away from the oil chamber is also possible, it is preferred for it to bulge toward the oil chamber because, among other things, more space is then available radially outside.

In a preferred embodiment, the extent of the oil duct also has a radial component in addition to the axial and circumferential components. Thus, the oil duct extends both circumferentially and axially (in a screw-like fashion) and at the same time also radially; i.e., it widens or narrows in a helical fashion.

In a preferred embodiment, the inlet opening, through which the oil is admitted or drawn into the oil duct, is located radially further inward than the outlet opening of the oil duct. Thus, the openings differ in their radial positions, the inlet opening being closer to the axis of rotation.

In a preferred embodiment that relates to an oil duct having an additional, radial extent, the inner cross section of the oil duct is adapted as a function of the radial position. Specifically, a width of the inner cross section, taken in the circumferential direction, increases from radially inside to radially outside; the oil duct or its inner volume, through which oil flows during operation, widens from radially inside to radially outside. Conversely, a height of the inner cross section, taken in the radial direction, decreases from radially inside to radially outside, preferably exactly inversely to the change in width. Thus, the cross-sectional geometry is advantageously adapted to the path of the duct.

In general, in a preferred embodiment, the oil duct is provided with an inner cross section whose shape varies over the extent of the oil duct, while its area remains unchanged. The inner cross section may be adapted, for example in the case of constraints, such as the presence of other structures. Such structures may be, for example, ribs or struts, or also shells for holding the bearing, etc., which, when disposed at the housing wall, would intersect and thus interfere with the optimal path of the duct. The duct may "go therearound," by locally adapting its cross-sectional shape, the cross-sectional area, however, being maintained constant. This condition is preferably also included in the embodiment discussed in the preceding paragraph. Thus, the duct, whose width varies as a function of the radial position and whose height is adapted, preferably has a constant area over all radial positions. In general, the constant area is advantageous with respect to the flow through the oil duct, and reference is made to the advantages mentioned at the outset.

In a preferred embodiment, the side walls of the oil duct that together bound the inner cross section thereof in the circumferential direction converge toward one another in the region of the outlet opening. This may be advantageous with respect to additive manufacturing, namely when build-up is performed in the opposite direction. Accordingly, the side walls diverge from one another along the build-up direction. Thus, while there is an overhang, this overhang is less pronounced or critical in the case of this V-shaped configuration than in the case of a U-shaped configuration, for example.

In a preferred embodiment, the side walls converging in a V-shape toward one another form an angle of at least 40°, preferably at least 50°, and (regardless thereof), for example, no more than 80°, preferably no more than 70°. A particularly preferred angle may be about 60°. This V-shape of the side walls is not necessarily reflected in the inner cross section of the oil duct. There, the space between the legs of the V-shape may preferably be filled with material during the additive manufacturing process, which may improve the flow of the oil toward and out through the outlet opening. The latter is preferably substantially circular in shape.

In a preferred embodiment, the outlet opening of the oil duct opens outside of the oil chamber. Thus, the oil is conveyed in the oil duct from radially inside the housing wall to radially outside, where, for example, a suction device, in particular a pump, may be disposed.

In a preferred embodiment, the housing wall, which is generally circularly symmetric or, at least in some sectors, rotationally symmetric to the axis of rotation of the shaft, is tilted relative thereto by no more than 60°, and further and particularly preferably by no more than 45° or no more than 20°. Due to the circular or rotational symmetry of the housing wall, the build-up direction is preferably parallel to the axis of rotation. Thus, any possible overhangs that may be disadvantageous during the additive manufacturing process are at least limited in extent. Considered here is in each case the smaller one of two angles formed between the axis of rotation and the housing wall (specifically, an angle of intersection between the housing wall and an axially parallel line is determined at each considered point of the housing wall).

In a preferred embodiment, the circumferential positions of the inlet and outlet openings of the oil duct are offset from one another by at least 40°, and further and particularly preferably by at least 60° or 70°. Preferable upper limits (regardless of the lower limits) are, with increasing preference in the order given, no more than 140°, 120° or 110°. Particularly preferred is an offset of about 90°. Thus, during operation, the oil is then conveyed from the bottom of the oil chamber toward the side to a middle height.

The present invention also relates to a turbine center frame for a turbomachine, in particular a jet engine, having a bearing chamber housing as disclosed herein. In general, the turbine center frame may also be disposed between the combustor and the turbine module(s), but is preferably designed to be disposed between two turbine modules, for example between the high-pressure turbine and the medium- or low-pressure turbine. The bearing chamber housing may then have disposed therein one or more bearings for supporting the shaft, such as, in the case of the exemplary embodiment, a ball bearing and a roller bearing.

In a preferred embodiment, the turbine center frame bounds a hot gas duct section radially outside the bearing chamber housing, through which section the hot gas flows from the combustor during operation. In the bearing chamber housing, the outlet opening of the oil duct is then preferably disposed axially behind its inlet opening; that is, aspiration is at an axially forward position ("forward" and "rearward" are relative to the hot gas flow through the hot gas duct section).

As mentioned earlier, the present invention also relates to a method for manufacturing a bearing chamber housing or turbine center frame as disclosed herein, the housing wall being additively built up with the oil duct. The additive build-up is preferably performed in a power-bed process, and thus, the material used for build-up is deposited in powder form sequentially layer by layer. In the process, a predetermined area selected based on a data model (of the component geometry) is solidified in each layer. The solidification is accomplished by melting using a radiation source, but an electron beam source is generally also conceivable, for example. Preferred is a laser source. That is, melting is performed with a laser beam, and thus, the additive build-up process is then selective laser melting (SLM).

Preferably, the oil duct is built up with side walls that are V-shaped in the region of the outlet opening (see above). The build-up direction may then be selected such that the side walls of the oil duct (diverging in this direction) are successively built up starting at the apex of the V-shape. It is generally preferred to limit overhangs in extent. A possible overhang should form an angle with the layers of no more than 60°and, with increasing preference in the order given, no more than 50°, 40° or 30°. Of course, it is generally preferred to avoid overhangs (i.e., 0°). However, this is not always possible. Considered here is the angle that a surface normal to the component surface in the region of the overhang forms with the layers, specifically with a plane containing an interface between two previously solidified layers.

The present invention also relates to the use of a bearing chamber housing or turbine center frame as disclosed herein for a turbomachine, in particular for a jet engine. The bearing chamber housing then accommodates the shaft of the turbomachine, which rotates about the axis of rotation during operation, the oil chamber of the bearing chamber housing being filled with oil.

BRIEF DESCRIPTION OF THE DRAWINGS

The present invention will now be explained in more detail with reference to an exemplary embodiment. The individual features may also be essential to the invention in other combinations within the scope of the other independent claims, and, as above, no distinction is specifically made between different claim categories.
In the drawings.

DETAILED DESCRIPTION

Figure 1:
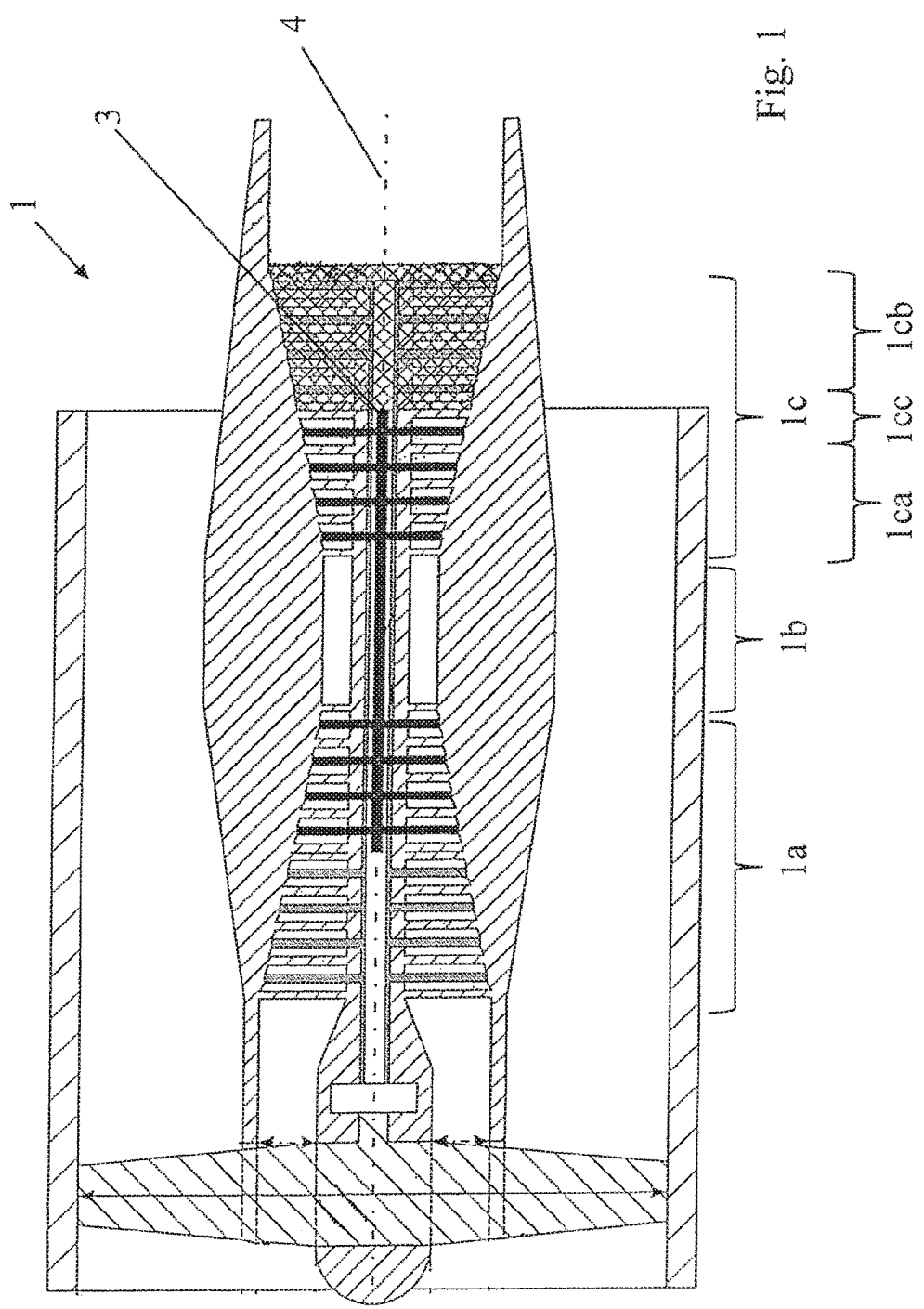
FIG. 1 is an axial cross-sectional view of a jet engine.

FIG. 1 shows, in schematic view, a turbomachine 1, specifically a jet engine. Turbomachine 1 is functionally divided into a compressor 1a, a combustor 1b and a turbine 1c. In the present case, both compressor 1a and turbine 1c are each made up of two modules. Turbine center frame 1cc is disposed between a high-pressure turbine module 1ca immediately downstream of combustor 1b and a low- or medium-pressure turbine module 1cb. The rotors of turbine modules 1ca, cb each rotate on a shaft 3 about an axis of rotation 4. A bearing/bearings for this shaft 3 is/are disposed in turbine center frame 1cc.

Figure 2:
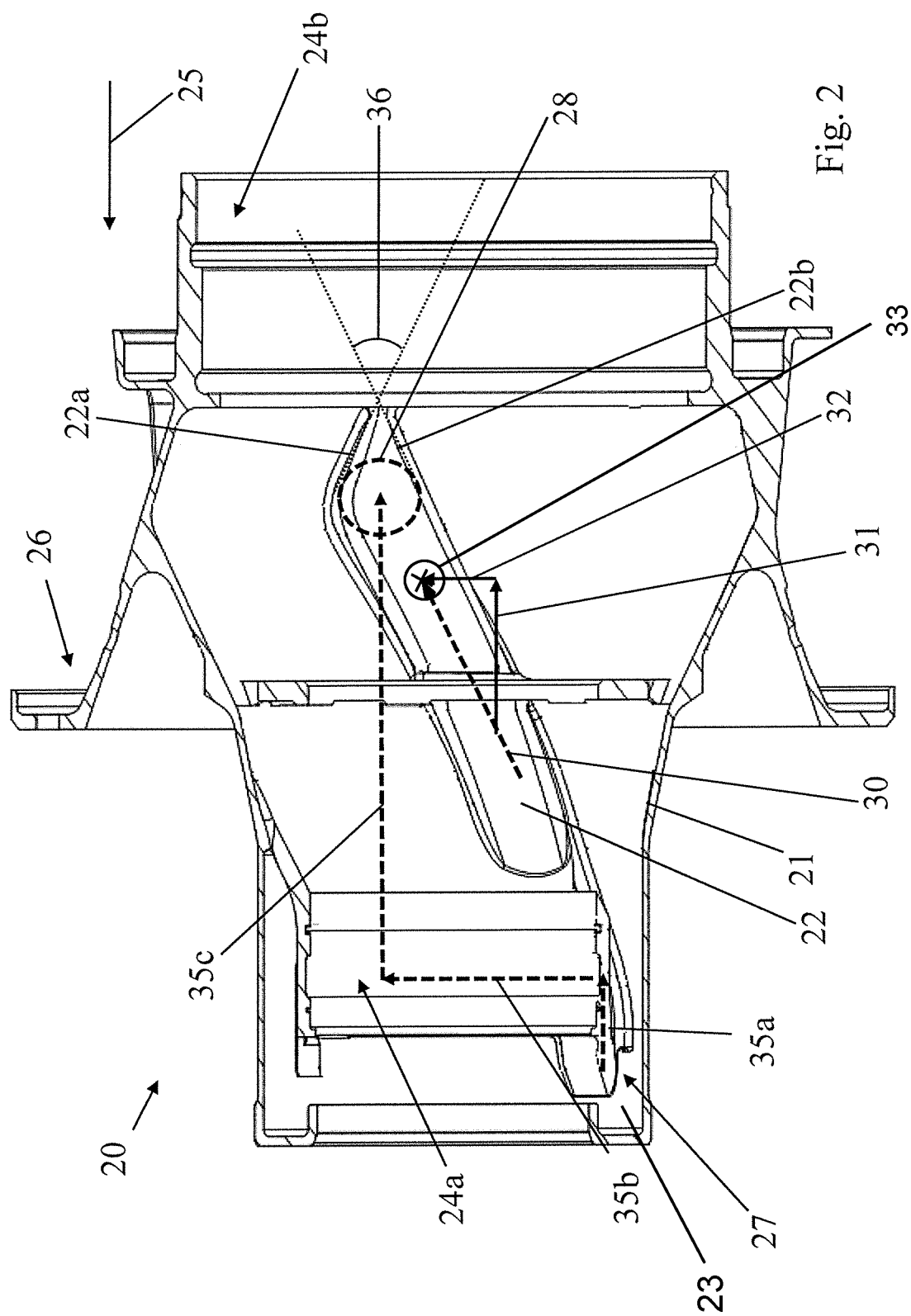
FIG. 2 is an axial cross-sectional side view of a bearing chamber housing having an oil duct according to the present invention.

FIG. 2 shows a bearing chamber housing 20 whose housing wall 21 is built up with an oil duct 22 in accordance with the present invention. Housing wall 21 radially outwardly bounds an oil chamber which, during operation of turbomachine 1, is filled with oil for lubricating the bearings. The bearing chamber housing 20 illustrated here provides two receptacles 24a,b, the axially forward one of which (the left one in the figure) receives a roller bearing and the axially rearward one of which (the right one in the figure) receives a ball bearing.

Housing wall 21 is additively built up, a build-up direction 25 pointing axially from aft to fore, which is primarily due to the geometry of external mounting flange 26, which is also produced in the build-up process. During the additive build-up of housing wall 21, oil duct 22 is built up as well. Oil can be aspirated from oil chamber 23 through an inlet opening 27 and conveyed through oil duct 22 to an outlet opening 28 (indicated by a dashed line and pointing outward) and thus to the outside of housing wall 21.

As can be seen from FIG. 2, oil duct 22 has an extent in both the axial and the circumferential directions. That is, its centerline 30 has an axial component 31 and a circumferential component 32. Furthermore, the extent also has a radial component 33 (shown schematically), namely extends radially outwardly from inlet opening 27 to outlet opening 28. This geometry makes it possible to produce an oil duct 22 of shortest possible length that connects inlet opening 27 to outlet opening 28 along the shortest path.

For purposes of illustration, a path 35 is drawn, along which the oil would need to be conveyed in the case of an oil duct formed in a casting process. This path 35 is divided into three sections, a first and a third one 35a,c each extending axially, and the solely circumferentially extending section 35b extending therebetween. Such a geometry, which would be possible using a casting manufacturing process, would result in a significantly longer oil duct.

As mentioned earlier, build-up is performed along build-up direction 25, and thus, oil duct 22 is built up starting at outlet opening 28 and proceeding towards inlet opening 27. In order to simplify this, side walls 22a,b of oil duct 2 are angled toward each other (i.e., converge toward one another) in a V-shape in the region of outlet opening 28, forming an angle 36 of 60° therebetween.

Figure 3:
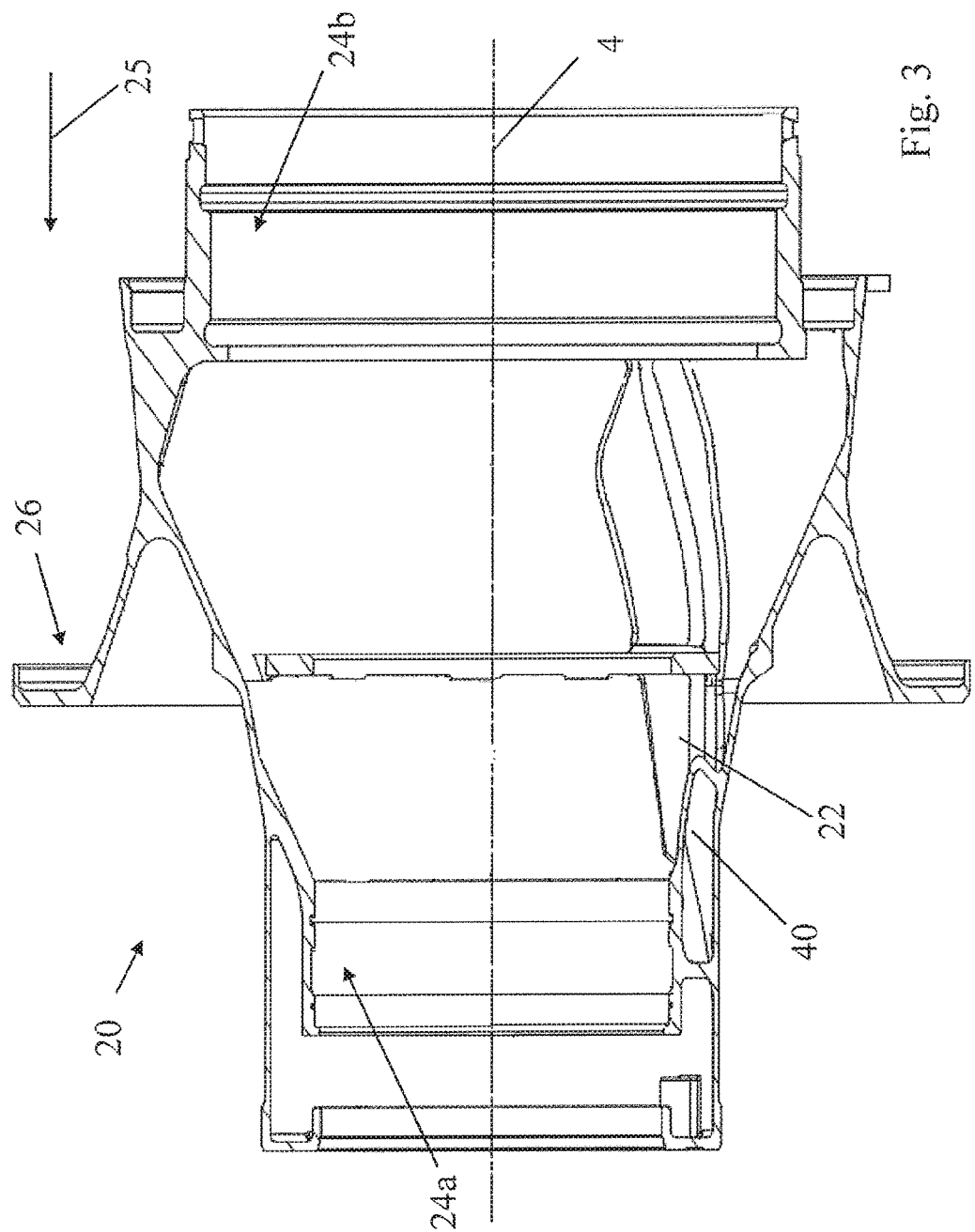
FIG. 3 is a view showing the bearing chamber housing of FIG. 2, again in an axial cross-sectional view, but looking in a different radial direction.

FIG. 3 also shows bearing chamber housing 20 in an axial cross-sectional view, but with the assembly slightly rotated counterclockwise. Accordingly, oil duct 22 is cut, thereby allowing viewing of the inner cross section 40 thereof. Due to the rotation, the inlet opening is now located in front of the plane of the paper; i.e., it is cut off in the figure.

Due to the relatively great shaping freedom allowed by additive manufacturing, the area of inner cross section 40 of oil duct 22 can be maintained constant over the extent of oil duct 22, even if inevitably present structures intersect the oil duct (as visible in FIG. 3). The height of inner cross section 40 decreases from radially inside to radially outside, because the width taken in the circumferential direction increases.

LIST OF REFERENCE NUMERALS

| | |
|---|---|
| turbomachine | 1 |
| compressor | 1a |
| combustor | 1b |
| turbine | 1c |
| high-pressure turbine module | 1ca |
| low- or medium-pressure turbine module | 1cb |
| turbine center frame | 1cc |
| shaft | 3 |
| axis of rotation | 4 |
| bearing chamber housing | 20 |
| housing wall | 21 |
| oil duct | 22 |
| side walls thereof | 22a, b |
| oil chamber | 23 |
| receptacles | 24a, b |
| build-up direction | 25 |
| mounting flange | 26 |
| inlet opening | 27 |
| outlet opening | 28 |
| centerline | 30 |
| axial component | 31 |
| circumferential component | 32 |
| radial component | 33 |
| path | 35 |
| first section thereof | 35a |
| second section thereof | 35b |

| LIST OF REFERENCE NUMERALS | |
|---|---|
| third section thereof | 35c |
| inner cross section | 40 |

What is claimed is:

1. A bearing chamber housing for supporting a shaft of a turbomachine, the bearing chamber housing comprising:
an additively built-up housing wall bounding an oil chamber of the bearing chamber housing radially outwardly relative to an axis of rotation of the shaft,
the housing wall being built up with an oil duct having an inlet opening toward the oil chamber for admission of oil from the oil chamber into the oil duct, the oil duct having an outlet opening for discharging the oil from the oil duct,
the outlet opening being located at a different axial position and at a different circumferential position than the inlet opening, considered relative to the axis of rotation of the shaft, the oil duct having an extent with both an axial component and a circumferential component, at least over a portion of the oil duct, wherein the inlet opening of the oil duct is located radially further inward than the outlet opening of the oil duct.

2. The bearing chamber housing as recited in claim 1 wherein, from radially inside to radially outside, a width of an inner cross section of the oil duct, taken in a circumferential direction, increases, and a height of the inner cross section, taken in a radial direction, decreases.

3. The bearing chamber housing as recited in claim 1 wherein the oil duct has an inner cross section whose shape varies over the extent, while an area of the inner cross section remains constant.

4. The bearing chamber housing as recited in claim 1 wherein side walls of the oil duct together bound an inner cross section of the oil duct in a circumferential direction, the side walls converging toward one another in the region of the outlet opening of the oil duct.

5. The bearing chamber housing as recited in claim 4 wherein the side walls converge in a V-shape toward one another and form an angle of at least 40° and no more than 80°.

6. The bearing chamber housing as recited in claim 1 wherein the outlet opening of the oil duct opens outside of the oil chamber bounded by the housing wall, so that the oil can be conveyed from the oil chamber through the oil duct to the outside of the oil chamber.

7. The bearing chamber housing as recited in claim 1 wherein the housing wall is tilted relative to the axis of rotation by an amount no more than 60°.

8. The bearing chamber housing as recited in claim 1 wherein circumferential positions of the inlet opening and the outlet opening are circumferentially offset from each other by at least 40° and no more than 140°.

9. A turbine center frame comprising the bearing chamber housing as recited in claim 1.

10. The turbine center frame as recited in claim 9, the turbine center frame bounding a hot gas duct section radially outside the bearing chamber housing, wherein, in the bearing chamber housing, the inlet opening of the oil duct is disposed axially behind the outlet opening relative to a flow through the hot gas duct section.

11. A method for manufacturing the bearing chamber housing as recited in claim 1 comprising additively building up the housing wall with the oil duct.

12. The method as recited in claim 11 wherein the housing wall is additively built up in a power-bed process.

13. A turbomachine comprising the bearing chamber housing as recited in claim 1.

14. A jet engine comprising the turbomachine as recited in claim 13.

15. A bearing chamber housing for supporting a shaft of a turbomachine, the bearing chamber housing comprising:
an additively built-up housing wall bounding an oil chamber of the bearing chamber housing radially outwardly relative to an axis of rotation of the shaft,
the housing wall being built up with an oil duct having an inlet opening toward the oil chamber for admission of oil from the oil chamber into the oil duct, the oil duct having an outlet opening for discharging the oil from the oil duct,
the outlet opening being located at a different axial position and at a different circumferential position than the inlet opening, considered relative to the axis of rotation of the shaft, the oil duct having an extent with both an axial component and a circumferential component, at least over a portion of the oil duct, wherein, from radially inside to radially outside, a width of an inner cross section of the oil duct, taken in a circumferential direction, increases, and a height of the inner cross section, taken in a radial direction, decreases.

16. A bearing chamber housing for supporting a shaft of a turbomachine, the bearing chamber housing comprising:
an additively built-up housing wall bounding an oil chamber of the bearing chamber housing radially outwardly relative to an axis of rotation of the shaft,
the housing wall being built up with an oil duct having an inlet opening toward the oil chamber for admission of oil from the oil chamber into the oil duct, the oil duct having an outlet opening for discharging the oil from the oil duct,
the outlet opening being located at a different axial position and at a different circumferential position than the inlet opening, considered relative to the axis of rotation of the shaft, the oil duct having an extent with both an axial component and a circumferential component, at least over a portion of the oil duct, wherein the oil duct has an inner cross section whose shape varies over the extent, while an area of the inner cross section remains constant.

17. A bearing chamber housing for supporting a shaft of a turbomachine, the bearing chamber housing comprising:
an additively built-up housing wall bounding an oil chamber of the bearing chamber housing radially outwardly relative to an axis of rotation of the shaft,
the housing wall being built up with an oil duct having an inlet opening toward the oil chamber for admission of oil from the oil chamber into the oil duct, the oil duct having an outlet opening for discharging the oil from the oil duct,
the outlet opening being located at a different axial position and at a different circumferential position than the inlet opening, considered relative to the axis of rotation of the shaft, the oil duct having an extent with both an axial component and a circumferential component, at least over a portion of the oil duct, wherein the housing wall is tilted relative to the axis of rotation by an amount no more than 60°.

18. A turbine center frame comprising:
a bearing chamber housing for supporting a shaft of a turbomachine, the bearing chamber housing comprising: an additively built-up housing wall bounding an oil chamber of the bearing chamber housing radially outwardly relative to an axis of rotation of the shaft, the housing wall being built up with an oil duct having an inlet opening toward the oil chamber for admission of oil from the oil chamber into the oil duct, the oil duct having an outlet opening for discharging the oil from the oil duct, the outlet opening being located at a different axial position and at a different circumferential position than the inlet opening, considered relative to the axis of rotation of the shaft, the oil duct having an extent with both an axial component and a circumferential component, at least over a portion of the oil duct, the turbine center frame bounding a hot gas duct section radially outside the bearing chamber housing, wherein, in the bearing chamber housing, the inlet opening of the oil duct is disposed axially behind the outlet opening relative to a flow through the hot gas duct section.

\* \* \* \* \*